(No Model.)
S. D. SMITH.
STEAM CANNING COOKER.
No. 547,590. Patented Oct. 8, 1895.
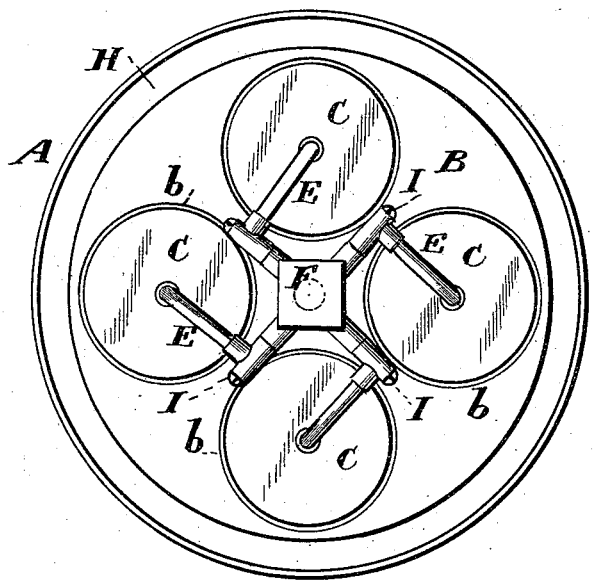
Fig. 1.
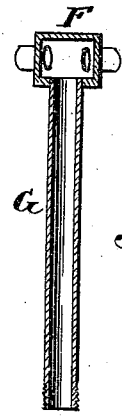
Fig. 4.
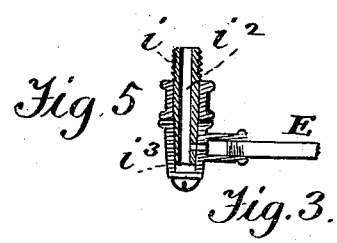
Fig. 5.
Fig. 2. Fig. 3.
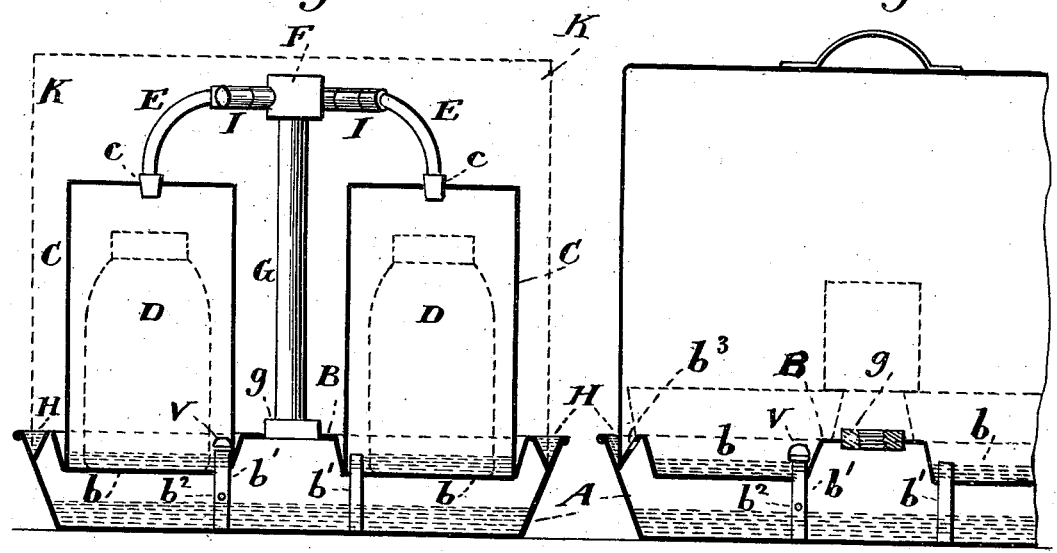
Fig. 6.
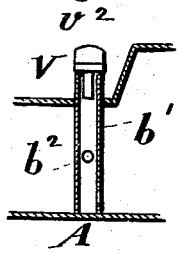
Witnesses.
A. Ruppert.
H. A. Daniels.
Inventor.
Stephen D. Smith,
Per
Thomas P. Simpson
atty.

UNITED STATES PATENT OFFICE.

STEPHEN DECATUR SMITH, OF ORLANDO, FLORIDA.

STEAM CANNING COOKER.

SPECIFICATION forming part of Letters Patent No. 547,590, dated October 8, 1895.

Application filed April 25, 1894. Serial No. 508,939. (No model.)

*To all whom it may concern:*

Be it known that I, STEPHEN DECATUR SMITH, a citizen of the United States, residing at Orlando, in the county of Orange and State of Florida, have invented certain new and useful Improvements in Steam Canning Cookers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to improvements in steam canning cookers.

The object of the present invention is to improve the construction of steam canning cookers and to provide a simple and inexpensive one, which will be effective and easily manipulated, and which will enable steam to be readily cut off from the supply-pipes when desired.

The invention consists in the construction and novel combination and arrangement of parts hereinafter fully described, illustrated in the accompanying drawings, and pointed out in the claims hereto appended.

In the drawings, Figure 1 is a plan view of a steam canning cooker constructed in accordance with this invention, the main receiver being removed. Fig. 2 is a vertical sectional view. Fig. 3 is a similar view, the steam-pipe being removed. Fig. 4 is a detail view of the steam-pipe. Fig. 5 is a detail view illustrating the construction of the cut-off. Fig. 6 is a detail view of the safety-valve.

In the drawings, A represents the steam-generator, adapted to be placed on a stove or over any other heater, the same being provided with a cover B, which is a shallow pan inverted and soldered into the base-pan of the generator with an air-tight joint. In this cover I stamp or otherwise construct a number of inwardly-projecting depressions or cavities $b\ b$ on the top thereof, so as to contain water and receive the open end of the receivers C, the two being thus connected by a liquid joint to prevent the too free escape of steam from the lower end of the receiver.

D are the cans, jars, or vessels containing food to be cooked, which are first placed in the cavities partially filled with water, and then covered by the receivers, which have a small central opening $c$ in the top. Through this opening, which may be made steam-tight by a nipple or by packing, passes the front end of the supply-pipe E, which takes its steam from the main steam-pipe G and discharges it upon the can or jar, so that it is enveloped on all sides and contents cooked to the intended degree, and while cooking the air from the jars of fruit or vegetables is exhausted and bubbles out with the steam through the water under the bottom of the receivers.

The dotted lines K K in Fig. 2 show the large receiver resting in the depression or trough H H in a liquid joint, which receiver is used when anything large, like a turkey, goose, or ham, is to be cooked, in which case the main steam-pipe G is unscrewed from its collar $g$ on the generator and laid aside.

F represents the five-way T, into whose openings are screwed the hinged or revolving shut-off cocks I I, which also receive the one end of the supply-pipes at their outer end. This shut-off cock is constructed by taking the hollow core $i^2$ with male thread $i$ upon inner end and enveloped in a ground joint by the sleeve $i^3$, which core is provided with an opening which is in register with the opening in the sleeve connected with the supply-pipe when the nipple of this supply-pipe is in the opening of the receiver, and when this supply-pipe is thrown back to remove the receiver and cans the openings are not in register and steam is shut off.

$b'\ b'$ are the small tubes, whose bottoms, with small openings therein, are soldered to the bottom of the generator and whose tops project through a water-tight opening in the bottom of the cavities for the receivers about one-half inch, so that the water will stand at about the depth of a half-inch in the cavities and whatever steam is condensed under the receivers the water flows into the top of the tube and out at the bottom, thus maintaining a constant supply of water. These tubes are also the means through which the generator is supplied with water. The opening $b^3$, Fig. 3, is a similar method for conveying the water from the condensed steam under the large receiver, which is simply an opening in the top of the generator in the trough H at the top of the water-line in H, through which the water will automatically return to the generator. When the large receiver is not in use, the opening is closed with a rubber or cork stopple. These small tubes $b'$, being soldered to the bottom and top of the generator, act as convenient braces to support the weight upon the top of generator. In one of these tubes there is an opening $b^2$ above the water in the generator, through which the steam may pass should all the cocks be shut off at the same time, in which case it passes off through the safety-valve V. This safety-valve is simply a loaded cap $v^2$, Fig. 6, with foot resting under the water in the cavity $b$ and fitting snugly but not too tightly upon the top of the tube $b'$. This top of the tube may be enveloped by a rubber tubing, and the cap may be loaded with lead or other heavy metal and given such a weight as will not be lifted by the ordinary pressure of steam desired for cooking purposes, but which will rise and allow the steam from the generator to escape should all the cocks inadvertently be shut off at the same time. It will be seen that only a small quantity of water is required for sealing the receivers and that a correspondingly small amount of heat is lost by exposure of such water to the atmosphere when the receivers are removed. It will also be apparent that the water of condensation is conveyed back to the generator and is prevented from overflowing upon a stove or other heating apparatus, that a small quantity of water will suffice for a large amount of steaming, and that the automatic safety-valve avoids all danger from too hot a fire and too great a pressure of steam.

What I claim as new, and desire to protect by Letters Patent, is—

1. In a steam canning cooker, the combination of a steam generator, provided in its top with a series of depressions, and having at its outer edge a groove or trough, and provided at the inner side of the same with an opening communicating with the interior of the generator, a series of tubes mounted in the generator and located at the depressions and extending through and projecting above the bottoms thereof and regulating the depth of the water in the depressions, and adapted to convey the surplus water back to the generator, a series of receivers mounted in the depressions, a steam pipe rising from the generator and provided with arms communicating with said receivers, and a main receiver having its lower edges arranged in said trough, substantially as described.

2. In a steam canning cooker, the combination of a steam generator, provided at its top with a series of depressions, a series of vertical tubes mounted in the generator and extending upward through the bottoms of the depressions to return the water of condensation to the generator, one of the tubes being provided with a perforation located within the steam generator, and arranged above the water line, a weighted safety plug removably fitted in and closing the upper end of the tube having said perforation, and a receiver, substantially as described.

In testimony whereof I affix my signature in presence of two witnesses.

STEPHEN DECATUR SMITH.

Witnesses:
L. G. STARBUCK,
M. O. DORX.